US010669020B2

(12) United States Patent
Vuong

(10) Patent No.: US 10,669,020 B2
(45) Date of Patent: Jun. 2, 2020

(54) ROTORCRAFT WITH COUNTER-ROTATING ROTOR BLADES CAPABLE OF SIMULTANEOUSLY GENERATING UPWARD LIFT AND FORWARD THRUST

(71) Applicant: Anh Vuong, Garland, TX (US)

(72) Inventor: Anh Vuong, Garland, TX (US)

(*) Notice: Subject to any disclaimer, the term of this patent is extended or adjusted under 35 U.S.C. 154(b) by 305 days.

(21) Appl. No.: 15/943,516

(22) Filed: Apr. 2, 2018

(65) Prior Publication Data

US 2019/0300166 A1    Oct. 3, 2019

(51) Int. Cl.
*B64C 27/10* (2006.01)
*B64C 27/82* (2006.01)
*B64C 27/20* (2006.01)
*B64C 27/467* (2006.01)

(52) U.S. Cl.
CPC .............. *B64C 27/10* (2013.01); *B64C 27/20* (2013.01); *B64C 27/467* (2013.01); *B64C 27/82* (2013.01); *B64C 2027/8245* (2013.01); *B64C 2027/8281* (2013.01)

(58) Field of Classification Search
CPC .......... B64C 11/001; B64C 2027/8236; B64C 2027/8245; B64C 2027/8281; B64C 27/10; B64C 27/20; B64C 27/467; B64C 27/82; B64C 29/0025; B64C 39/001; B64C 29/00; B64C 39/064
See application file for complete search history.

(56) References Cited

U.S. PATENT DOCUMENTS

| 1,771,053 | A | * | 7/1930 | Martin | B64C 39/00 244/212 |
| 2,876,965 | A | * | 3/1959 | Streib | B64C 39/06 244/12.2 |
| 2,927,746 | A | * | 3/1960 | Mellen | B64C 39/064 244/12.2 |
| 2,935,275 | A | * | 5/1960 | Grayson | B64C 39/001 244/23 C |
| 3,034,747 | A | * | 5/1962 | Lent | B64C 39/064 244/23 C |
| 3,041,012 | A | * | 6/1962 | Gibbs | B64C 39/001 244/17.23 |
| 3,045,951 | A | * | 7/1962 | Freeland | B64C 39/001 244/23 C |
| 3,051,414 | A | * | 8/1962 | Frost | B64C 39/064 244/12.2 |

(Continued)

*Primary Examiner* — Medhat Badawi

(57) ABSTRACT

A rotorcraft with counter-rotating rotor blades can hover in place, translate forwards, backwards, or side-to-side irrespective of the airspeed over the rotorcraft. The rotorcraft includes a fuselage, a first axial-flow rotor, a radial-flow rotor, a propulsion funnel, and a plurality of lift funnels. The fuselage is used to house passengers, cargo, flight electronics, and or fuel. The first axial-flow rotor rotates independent of the radial-flow rotor and generates forward thrust for propelling the rotorcraft. The radial-flow rotor in the opposite direction of the first axial-flow rotor and generates upward thrust for lifting the rotorcraft. The airflow generated by the first axial-flow rotor travels through the propulsion funnel and exits out of the back of the rotorcraft. The airflow generated by the radial-flow rotor travels through the plurality of lift funnels which gradually directs the airflow downwards.

20 Claims, 12 Drawing Sheets

(56) References Cited

U.S. PATENT DOCUMENTS

| | | | | | |
|---|---|---|---|---|---|
| 3,067,967 | A | * | 12/1962 | Barr | B64C 29/0066 244/12.2 |
| 3,082,977 | A | * | 3/1963 | Arlin | B64C 29/0025 244/17.23 |
| 3,103,325 | A | * | 9/1963 | Leutzinger | F02C 3/085 244/12.1 |
| 3,107,071 | A | * | 10/1963 | Wessels | B64C 29/0025 244/23 R |
| 3,288,235 | A | * | 11/1966 | Jones | B60V 1/12 180/122 |
| 3,394,906 | A | * | 7/1968 | Rogers | B64C 39/001 244/23 R |
| 3,410,507 | A | * | 11/1968 | Moller | B64C 29/0025 244/23 C |
| 3,442,469 | A | * | 5/1969 | Davis | B64C 39/001 244/23 C |
| 3,456,902 | A | * | 7/1969 | Visconti | B64C 39/062 244/23 R |
| 3,465,989 | A | * | 9/1969 | Bowshier | B64C 39/06 244/23 C |
| 3,484,060 | A | * | 12/1969 | Trupp | B64C 29/0066 244/53 R |
| 3,507,461 | A | * | 4/1970 | Rosta | B64C 39/001 244/17.23 |
| 3,514,053 | A | * | 5/1970 | McGuinness | B64C 39/001 244/12.2 |
| 3,519,224 | A | * | 7/1970 | Boyd | B64C 29/0066 244/23 R |
| 3,525,484 | A | * | 8/1970 | Mueller | B64C 39/064 244/12.2 |
| 3,558,080 | A | * | 1/1971 | Kretz | B64C 39/001 244/17.11 |
| 3,568,955 | A | * | 3/1971 | McDevitt | B64C 39/001 244/23 C |
| 3,614,030 | A | * | 10/1971 | Moller | B64C 39/001 244/23 C |
| 3,632,065 | A | * | 1/1972 | Rosta | B64C 27/20 244/17.11 |
| 3,640,489 | A | * | 2/1972 | Jaeger | B64C 39/001 244/23 C |
| 3,677,503 | A | * | 7/1972 | Freeman, Jr. | B64C 11/001 244/23 C |
| 3,690,597 | A | * | 9/1972 | Renato Di Martino | B64C 27/20 244/23 C |
| 3,774,865 | A | * | 11/1973 | Pinto | B64C 39/001 244/23 C |
| 3,838,835 | A | * | 10/1974 | Kling | B64C 27/20 244/23 C |
| 3,933,325 | A | * | 1/1976 | Kaelin | B64C 39/001 244/23 C |
| 4,014,483 | A | * | 3/1977 | MacNeill | B64B 1/02 244/5 |
| 4,023,751 | A | * | 5/1977 | Richard | B64C 39/001 244/23 C |
| 4,050,652 | A | * | 9/1977 | DeToia | B64C 39/001 244/23 C |
| 4,184,119 | A | * | 1/1980 | Kerruish | A63H 17/32 446/231 |
| 4,208,025 | A | * | 6/1980 | Jefferson | B64C 27/00 244/12.2 |
| 4,214,720 | A | * | 7/1980 | DeSautel | B64C 39/001 244/12.2 |
| 4,461,436 | A | * | 7/1984 | Messina | B64C 27/20 244/23 C |
| 4,685,640 | A | * | 8/1987 | Warrington | B64B 1/00 244/23 C |
| 4,781,642 | A | * | 11/1988 | Stanzel | A63H 27/12 446/38 |
| 4,807,830 | A | * | 2/1989 | Horton | B64C 39/001 244/12.2 |
| 4,941,628 | A | * | 7/1990 | Sakamoto | B64C 29/0041 244/12.2 |
| 4,994,660 | A | * | 2/1991 | Hauer | F02K 1/008 239/265.41 |
| 5,039,014 | A | * | 8/1991 | Lippmeier | F02K 1/12 239/265.33 |
| 5,039,031 | A | * | 8/1991 | Valverde | B64C 39/001 244/12.2 |
| 5,064,143 | A | * | 11/1991 | Bucher | B64C 27/20 244/23 C |
| 5,072,892 | A | * | 12/1991 | Carrington | B64C 39/001 244/12.2 |
| 5,178,344 | A | * | 1/1993 | Dlouhy | B64C 27/20 244/12.2 |
| 5,213,284 | A | * | 5/1993 | Webster | B64C 39/001 244/12.2 |
| 5,259,571 | A | * | 11/1993 | Blazquez | B64C 39/001 244/12.2 |
| 5,269,467 | A | * | 12/1993 | Williams | F02K 1/805 239/265.19 |
| 5,318,248 | A | * | 6/1994 | Zielonka | B64C 39/001 244/12.2 |
| 5,344,100 | A | * | 9/1994 | Jaikaran | B64C 27/20 244/12.2 |
| 5,351,888 | A | * | 10/1994 | Taylor | B64D 33/08 239/127.3 |
| 5,419,513 | A | * | 5/1995 | Flemming, Jr. | B64C 27/20 244/12.2 |
| 5,421,538 | A | * | 6/1995 | Vassa | B64C 27/20 244/100 R |
| 5,437,411 | A | * | 8/1995 | Renggli | F02K 1/008 239/265.39 |
| 5,485,959 | A | * | 1/1996 | Wood | F02K 1/002 239/265.19 |
| 5,503,351 | A | * | 4/1996 | Vass | B64C 39/064 244/12.2 |
| 5,507,453 | A | * | 4/1996 | Shapery | B64C 15/00 244/12.2 |
| 5,524,827 | A | * | 6/1996 | Znamensky | F02K 1/002 239/265.33 |
| 5,653,404 | A | * | 8/1997 | Ploshkin | B63G 8/00 244/12.2 |
| 5,683,060 | A | * | 11/1997 | Iturralde | B64B 1/00 244/165 |
| 5,803,199 | A | * | 9/1998 | Walter | B60V 1/11 180/117 |
| 5,895,011 | A | * | 4/1999 | Gubin | B64C 29/00 244/12.1 |
| 6,050,520 | A | * | 4/2000 | Kirla | B64C 29/00 244/10 |
| 6,067,793 | A | * | 5/2000 | Urruela | F02K 1/008 239/265.33 |
| 6,113,029 | A | * | 9/2000 | Salinas | B64C 39/064 244/12.6 |
| 6,189,332 | B1 | * | 2/2001 | Ota | B29C 71/02 416/241 A |
| 6,192,671 | B1 | * | 2/2001 | Elorriaga | F02K 1/008 239/265.39 |
| 6,195,981 | B1 | * | 3/2001 | Hanley | F02K 1/008 60/204 |
| 6,212,877 | B1 | * | 4/2001 | Renggli | F02K 1/008 239/265.35 |
| 6,270,036 | B1 | * | 8/2001 | Lowe, Jr. | B64B 1/00 244/12.2 |
| 6,352,219 | B1 | * | 3/2002 | Zelic | B64C 11/006 244/12.1 |
| 6,368,062 | B1 | * | 4/2002 | Yagami | F04D 29/282 416/178 |
| 6,382,560 | B1 | * | 5/2002 | Ow | B64C 27/20 244/12.2 |
| 6,405,976 | B1 | * | 6/2002 | Jacoby | B64C 27/20 244/34 R |
| 6,450,445 | B1 | * | 9/2002 | Moller | B64C 29/02 244/12.1 |
| 6,575,401 | B1 | * | 6/2003 | Carver | B64C 27/20 244/12.2 |

(56) References Cited

U.S. PATENT DOCUMENTS

| | | | | |
|---|---|---|---|---|
| 6,616,094 B2* | 9/2003 | Illingworth | B64C 11/001 | 244/12.1 |
| 6,669,138 B1* | 12/2003 | Arrieta | B64C 39/064 | 244/12.2 |
| 6,672,539 B1* | 1/2004 | Schoeneck | B64C 27/20 | 244/12.2 |
| 6,802,693 B2* | 10/2004 | Reinfeld | B64C 11/001 | 416/1 |
| 6,837,457 B2* | 1/2005 | Kirjavainen | B64C 39/001 | 244/12.2 |
| 6,843,699 B2* | 1/2005 | Davis | A63H 27/04 | 244/23 C |
| 7,147,183 B1* | 12/2006 | Carr | B64C 39/064 | 244/12.2 |
| 7,201,346 B2* | 4/2007 | Hansen | B64C 27/20 | 244/12.1 |
| 7,407,132 B2* | 8/2008 | Kirjavainen | B64C 39/001 | 180/117 |
| 7,465,236 B2* | 12/2008 | Wagels | A63G 31/00 | 434/34 |
| 7,497,759 B1* | 3/2009 | Davis | A63H 27/12 | 244/23 C |
| 7,604,198 B2* | 10/2009 | Petersen | B64C 27/10 | 244/17.23 |
| 7,857,256 B2* | 12/2010 | Hatton | B64C 39/064 | 244/12.2 |
| 8,353,199 B1* | 1/2013 | Ma | A63H 27/12 | 108/136 |
| 8,991,743 B1* | 3/2015 | Pope | B64C 27/82 | 244/17.11 |
| 2002/0142699 A1* | 10/2002 | Davis | A63H 27/04 | 446/37 |
| 2004/0094662 A1* | 5/2004 | Sanders, Jr. | B64C 27/20 | 244/12.5 |
| 2004/0237534 A1* | 12/2004 | Webster | B64D 33/04 | 60/771 |
| 2005/0230525 A1* | 10/2005 | Paterro | B64C 39/001 | 244/23 B |
| 2006/0049304 A1* | 3/2006 | Sanders, Jr. | B64C 27/12 | 244/23 A |
| 2006/0113425 A1* | 6/2006 | Rader | B64C 15/00 | 244/17.11 |
| 2006/0194504 A1* | 8/2006 | Ragonetti | A01K 15/025 | 446/46 |
| 2006/0214052 A1* | 9/2006 | Schlunke | B64C 39/064 | 244/12.2 |
| 2008/0223979 A1* | 9/2008 | Schlunke | B64C 39/064 | 244/12.2 |
| 2009/0016877 A1* | 1/2009 | Schlunke | B64C 39/064 | 415/208.1 |
| 2010/0051754 A1* | 3/2010 | Davidson | B64C 17/06 | 244/23 C |
| 2010/0258681 A1* | 10/2010 | Chen | B64C 39/00 | 244/34 A |
| 2010/0264256 A1* | 10/2010 | Yim | B64C 27/20 | 244/17.23 |
| 2010/0282918 A1* | 11/2010 | Martin | B64C 17/06 | 244/23 C |
| 2010/0320333 A1* | 12/2010 | Martin | B64C 17/06 | 244/23 A |
| 2011/0009026 A1* | 1/2011 | Feng | A63H 33/18 | 446/46 |
| 2011/0101155 A1* | 5/2011 | Smith | B64C 39/024 | 244/12.1 |
| 2011/0139923 A1* | 6/2011 | Papanikolopoulos | A63H 27/12 | 244/2 |
| 2011/0155860 A1* | 6/2011 | Chapman | B64C 27/20 | 244/23 A |
| 2012/0306332 A1* | 12/2012 | Cardell | A63H 27/12 | 312/223.1 |
| 2013/0206915 A1* | 8/2013 | Desaulniers | B64C 39/024 | 244/165 |
| 2013/0240025 A1* | 9/2013 | Bersano | F24S 25/50 | 136/251 |
| 2016/0150304 A1* | 5/2016 | Lee | H02K 7/09 | 310/90.5 |
| 2016/0152327 A1* | 6/2016 | Bertels | F03D 9/255 | 417/423.7 |
| 2016/0152338 A1* | 6/2016 | Schlunke | A63H 27/12 | 244/23 R |
| 2016/0262447 A1* | 9/2016 | Davidson | A24F 3/00 | |
| 2016/0347448 A1* | 12/2016 | Henning, Jr. | B64C 39/06 | |
| 2018/0037319 A1* | 2/2018 | Noroyan | B64C 29/0033 | |
| 2018/0222603 A1* | 8/2018 | Grigg | B64C 15/02 | |
| 2019/0300166 A1* | 10/2019 | Vuong | B64C 27/10 | |

\* cited by examiner

ROTORCRAFT WITH COUNTER-ROTATING ROTOR BLADES CAPABLE OF SIMULTANEOUSLY GENERATING UPWARD LIFT AND FORWARD THRUST

FIELD OF THE INVENTION

The present invention generally relates to a rotorcraft with counter-rotating rotor blades capable of simultaneously generating upward lift and forward thrust. More specifically, a radial-flow rotor generates upward thrust whereas an axial-flow rotor selectively generates forward thrust.

BACKGROUND OF THE INVENTION

Conventional rotorcrafts such as helicopters use exposed main rotors to generate lift and forward thrust. By tilting the main rotor to the front, back, or side-to-side the helicopter can change direction and maneuver to the desired position. However, the main rotor is also a source of the majority of the aerodynamic drag experienced by the helicopter in forward flight. In fact, the aerodynamic drag is so great that the fastest helicopters available today can only achieve a small fraction of the speed of an ordinary fixed wing aircraft. For example, the world record for the fastest helicopter is held by the Westland Lynx which achieved a speed of 249.9 miles per hour (mph). In comparison, even a small propeller powered aircraft such as the TBM 900 can cruise at a speed of 378 mph. The sluggish speed of helicopters is made even more apparent when one considers that most conventional helicopters achieve nowhere near the speed of the Lynx. For most helicopters, the aerodynamic drag produced by the rotors is so great that most helicopters travel at speeds which would cause most commercial jetliners to stall.

It is therefore the object of the present invention to provide a propulsion system enabling the same omni-directional maneuvering capability of the helicopter while reducing or eliminating the massive aerodynamic drag created by the main rotor of the helicopter. It is yet another object of the present invention to package the propulsion system as compactly as possible to reduce the cross-section impinging on the oncoming airflow and creating aerodynamic drag. It is yet another object of the present invention to eliminate the yaw moment experienced by conventional helicopter without the use of a tail rotor. Instead, the propulsion system utilizes counter-rotating rotors to cancel out the yaw moment generated by each individual rotor.

Using the propulsion system, the present invention can maneuver just like a conventional helicopter. For example, the propulsion system generates full thrust irrespective of the airspeed, thereby allowing the present invention to take off vertically and hover in place. The propulsion system also allows the present invention to tilt about the roll or yaw axis to translate sideways, forwards, and back.

DETAILED DESCRIPTION OF THE INVENTION

All illustrations of the drawings are for the purpose of describing selected versions of the present invention and are not intended to limit the scope of the present invention.

Figure 1:
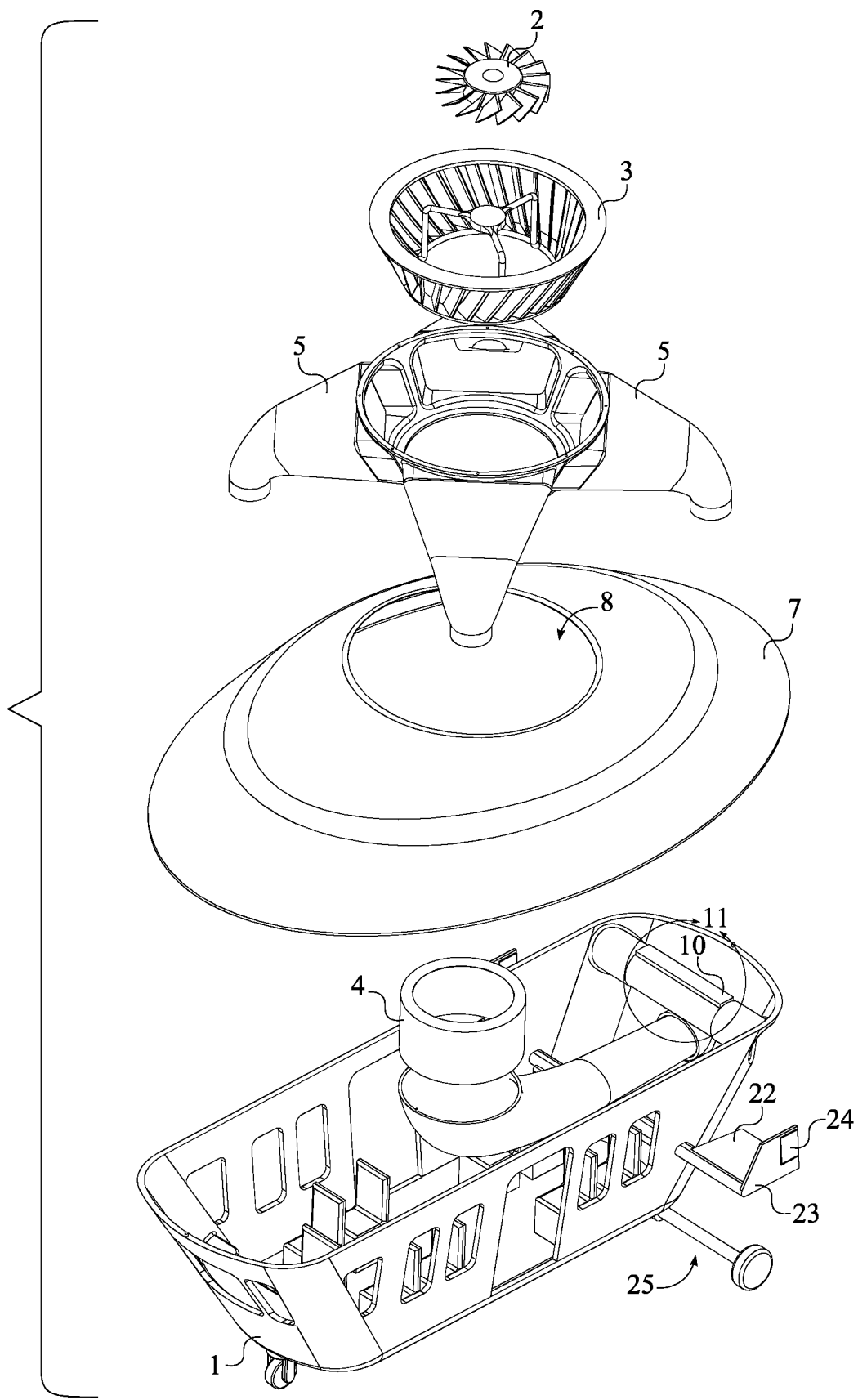
FIG. 1 is an exploded view of that shows the fuselage with the roof removed.
Figure 2:
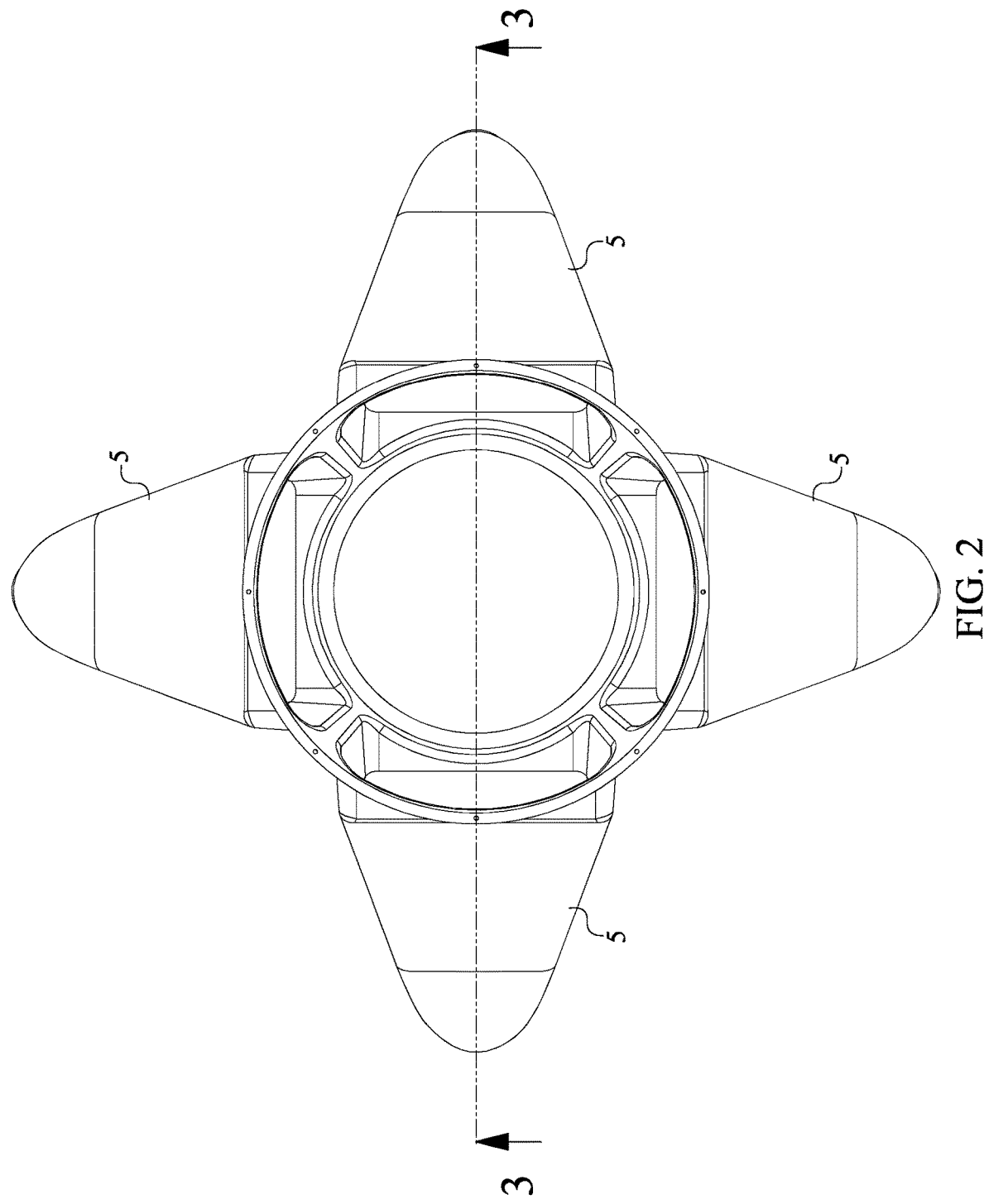
FIG. 2 is a top view of the plurality of lift funnels.

The present invention is a rotorcraft utilizing a propulsion system capable of generating both lift and forward thrust in a compact aerodynamic package. The propulsion system utilizes counter-rotating rotor blades integrated into a package that reduces the cross-section of the rotorcraft, thereby enabling highly efficient flight. Referring to FIG. 1, the preferred embodiment of the present invention comprises a fuselage 1, a first axial-flow rotor 2, a radial-flow rotor 3, a propulsion funnel 4, and a plurality of lift funnels 5. In a manned embodiment, the fuselage 1 may carry passengers, cargo, and/or fuel, whereas in an unmanned embodiment, the fuselage 1 may carry flight electronics and navigation equipment along with fuel. In the preferred embodiment, the first axial-flow rotor 2 generates forward thrust that propels the present invention. In contrast, the radial-flow rotor 3 generates upward thrust that lifts the present invention.

The propulsion funnel 4 manipulates the direction of the thrust generated by the first axial-flow rotor 2. Similarly, the plurality of lift funnels 5 manipulates the direction of the thrust generated by the radial-flow rotor 3.

Referring to FIG. 1-FIG. 5, the preferred embodiment of the propulsion funnel 4 comprises a propulsion inlet 41 and a propulsion outlet 42. The propulsion inlet 41 is vertically oriented to the fuselage 1, whereas the propulsion outlet 42 is horizontally oriented to the fuselage 1. Each of the plurality of lift funnels 5 comprises a lift inlet 51 and a lift outlet 52. The plurality of lift funnels 5 is radially positioned around the propulsion inlet 41. The first axial-flow rotor 2 and the radial-flow rotor 3 is rotatably and laterally mounted to the fuselage 1. Further, the first axial-flow rotor 2 is encircled by the radial-flow rotor 3. As a result, a rotation axis of the first axial-flow rotor 2 and a rotation axis of the radial-flow rotor 3 is coaxially positioned to a yaw axis 12 of the fuselage 1. In the preferred embodiment, the first axial-flow rotor 2 has a smaller diameter than the radial-flow rotor 3. Therefore, the first axial-flow rotor 2 is circumscribed by the radial-flow rotor 3. The first axial-flow rotor 2 is in fluid communication with the propulsion inlet 41. In particular, the first axial-flow rotor 2 is housed within the propulsion inlet 41. As a result, the first axial-flow rotor 2 is sealed off from the plurality of lift funnels 5. Further, the propulsion outlet 42 is positioned adjacent to the fuselage 1. More specifically, the propulsion outlet 42 may be positioned adjacent to the rear surface of the fuselage 1. Thus, the thrust expelled out of the propulsion outlet 42 propels the present invention forward. The propulsion outlet 42 is concentrically positioned around a roll axis 11 of the fuselage 1. Aligning the propulsion outlet 42 with the roll axis 11 of the fuselage 1 eliminates the yaw moment generated by the application of forward thrust.

Figure 3:
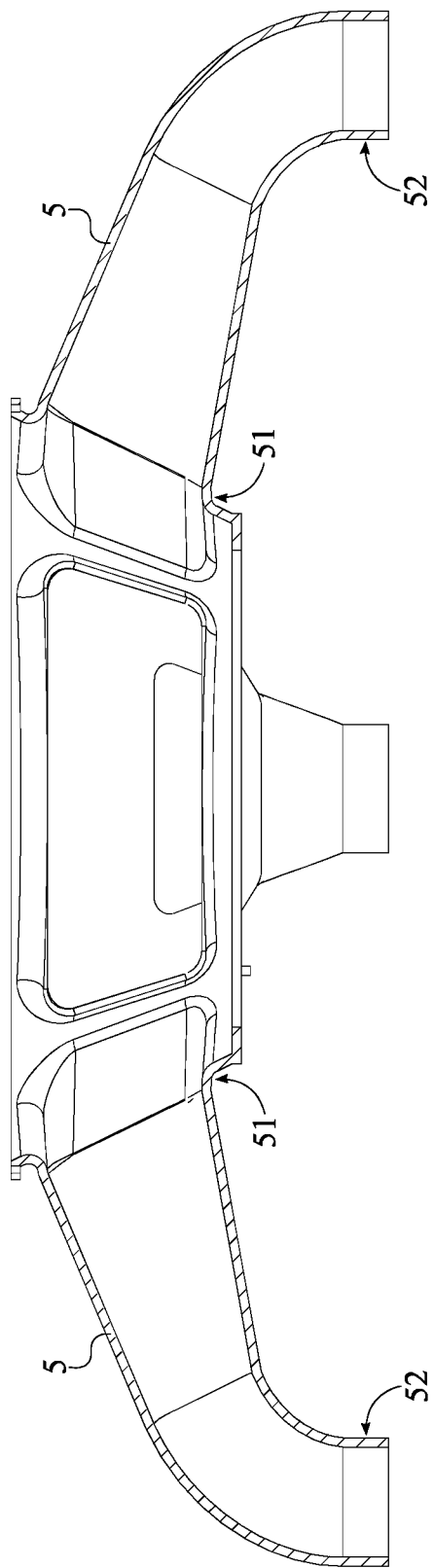
FIG. 3 is a cross-sectional taken along line 3-3 in FIG. 2.
Figure 4:
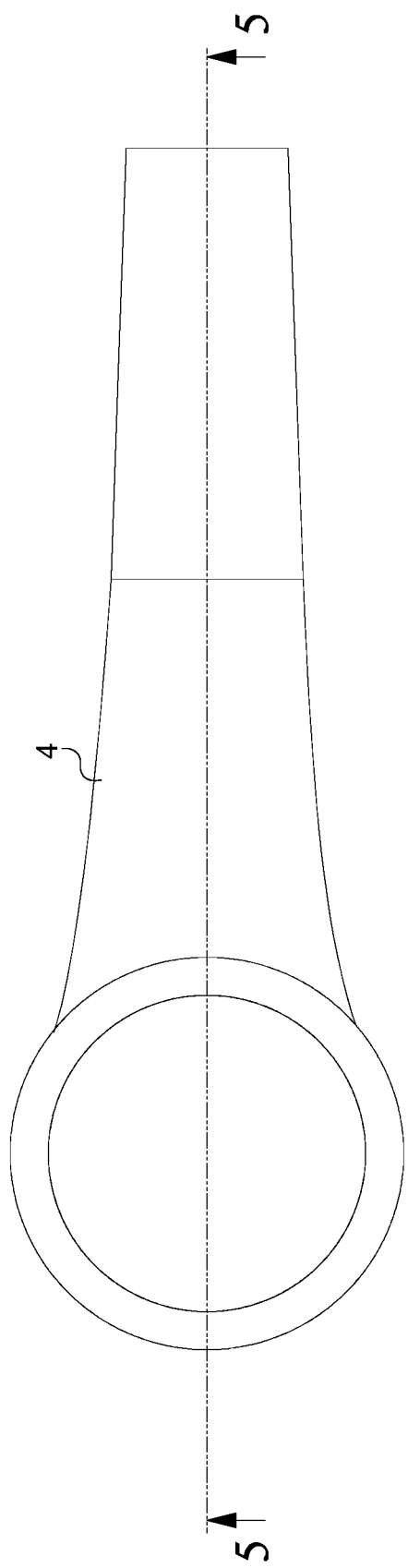
FIG. 4 is a top view of the propulsion funnel.

Referring more specifically to FIG. 1 and FIG. 3, similarly, the radial-flow rotor 3 is in fluid communication with the lift inlet 51 for each of the plurality of lift funnels 5. Air flow generated by the radial-flow rotor 3 enters the lift inlet 51 and is directed downwards through the lift outlet 52. The lift outlet 52 for each of the plurality of lift funnels 5 is positioned around the fuselage 1. More specifically, the plurality of lift funnels 5 is symmetric about a roll axis 11 and a yaw axis 12 of the fuselage 1. This prevents the roll and pitch moments generated by the uneven application of downwards thrust. Further, the lift outlet 52 for each of the plurality of lift funnels 5 is positioned parallel to the yaw axis 12 of the fuselage 1, thereby enabling highly stable hovering flight.

Figure 5:
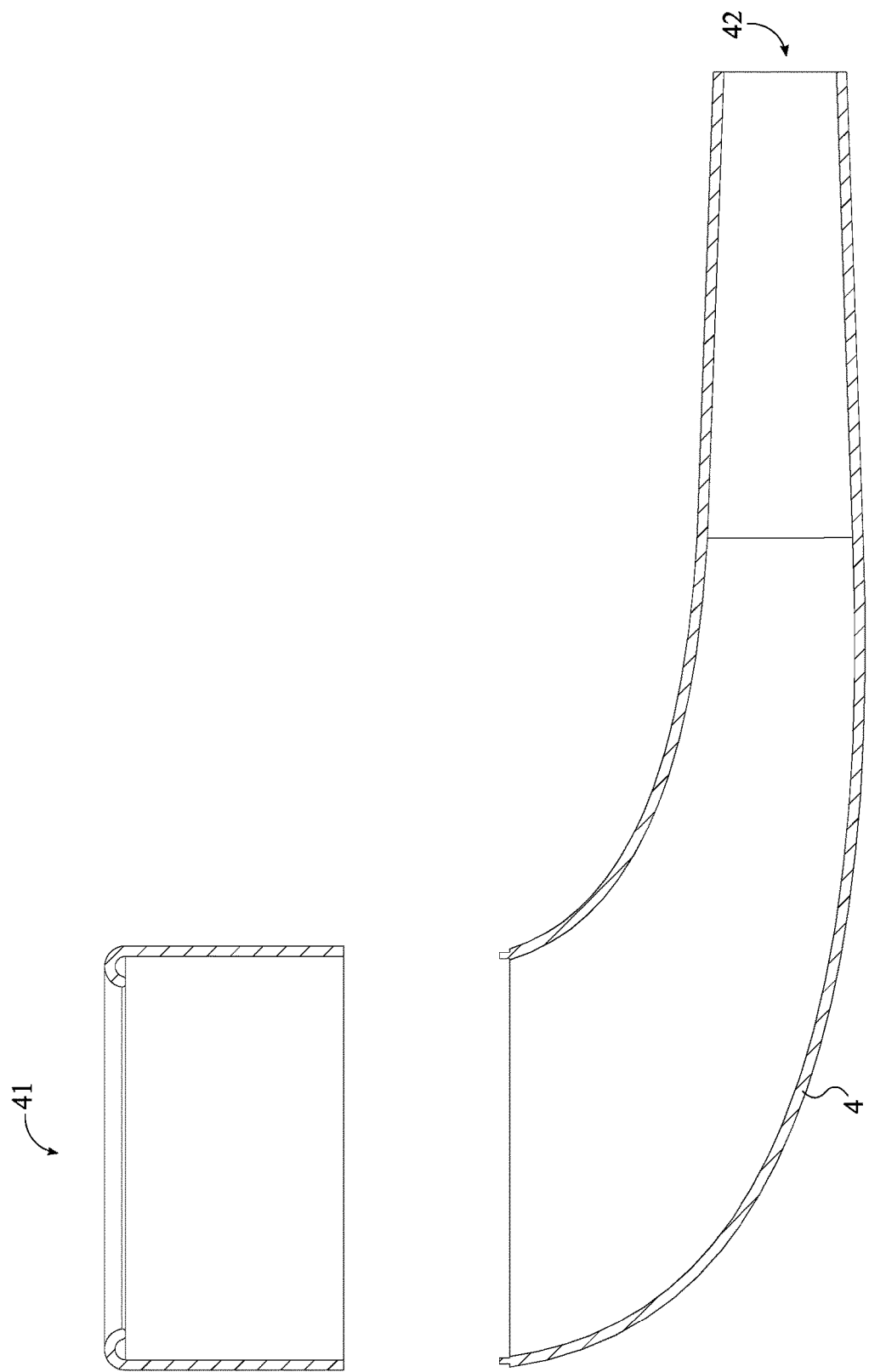
FIG. 5 is a cross-sectional view taken along line 5-5 in FIG. 4.

Referring more specifically to FIG. 1 and FIG. 5, the preferred propulsion funnel 4 is a J-shaped tube positioned between the propulsion inlet 41 and the propulsion outlet 42 that creates a sealed continuous passage. In the preferred embodiment of the present invention, the propulsion funnel 4 is positioned through the fuselage 1. Moreover, the propulsion funnel 4 tapers from the propulsion inlet 41 to the propulsion outlet 42. Tapering the propulsion funnel 4 towards the propulsion outlet 42 increases the velocity of the airflow. In alternate embodiments of the present invention, the propulsion funnel 4 may be housed in the aerodynamic housing 7 to increase the usable space in the fuselage 1.

As can be seen in FIG. 3, likewise, each of the plurality of lift funnels 5 is also a J-shaped tube that creates a continuous sealed path between the lift inlet 51 and the lift outlet 52. As such, each of the plurality of lift funnels 5 is mounted about the fuselage 1. In the preferred embodiment, a roof is positioned over fuselage 1. The roof is a large flat plate that extends over the sides of the fuselage 1. The plurality of lift funnels 5 is radially mounted around the yaw axis 12 of the fuselage 1. More specifically, the lift outlet 52 for each of the plurality of lift funnels 5 traverses through the overhanging portions of the roof. As a result, the lift outlet 52 for each of the plurality of lift funnels 5 is offset from the fuselage 1. To increase the effective flow velocity of the air flow exiting the left outlet 52, each of the plurality of lift funnels 5 tapers from the lift inlet 51 to the lift outlet 52. Reducing the cross-sectional area of the plurality of lift funnels 5 between the lift inlet 51 and the lift outlet 52 accelerates the air flow traveling therein.

Figure 7:
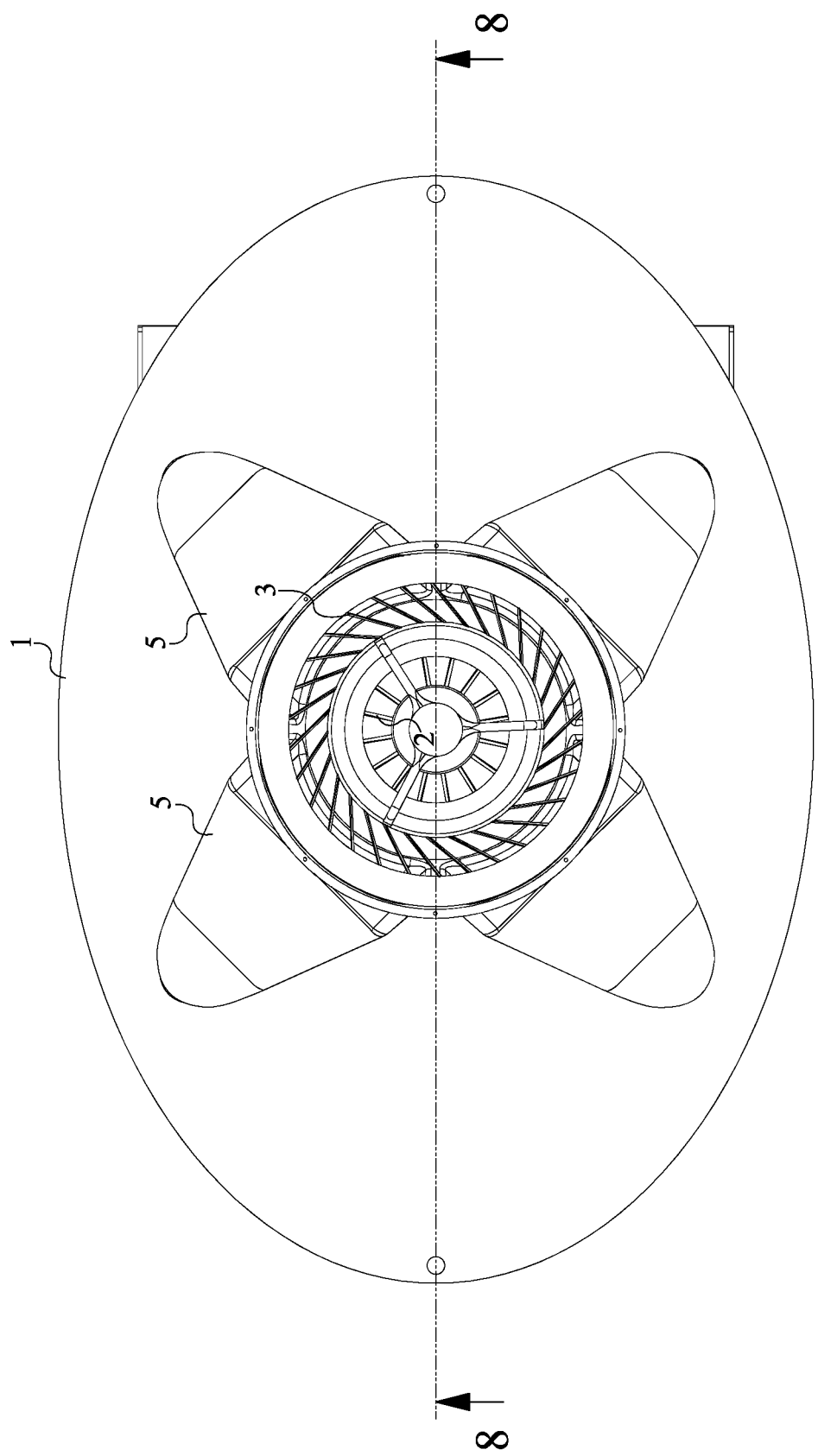
FIG. 7 is a top view illustrating the present invention with the aerodynamic housing removed.
Figure 8:
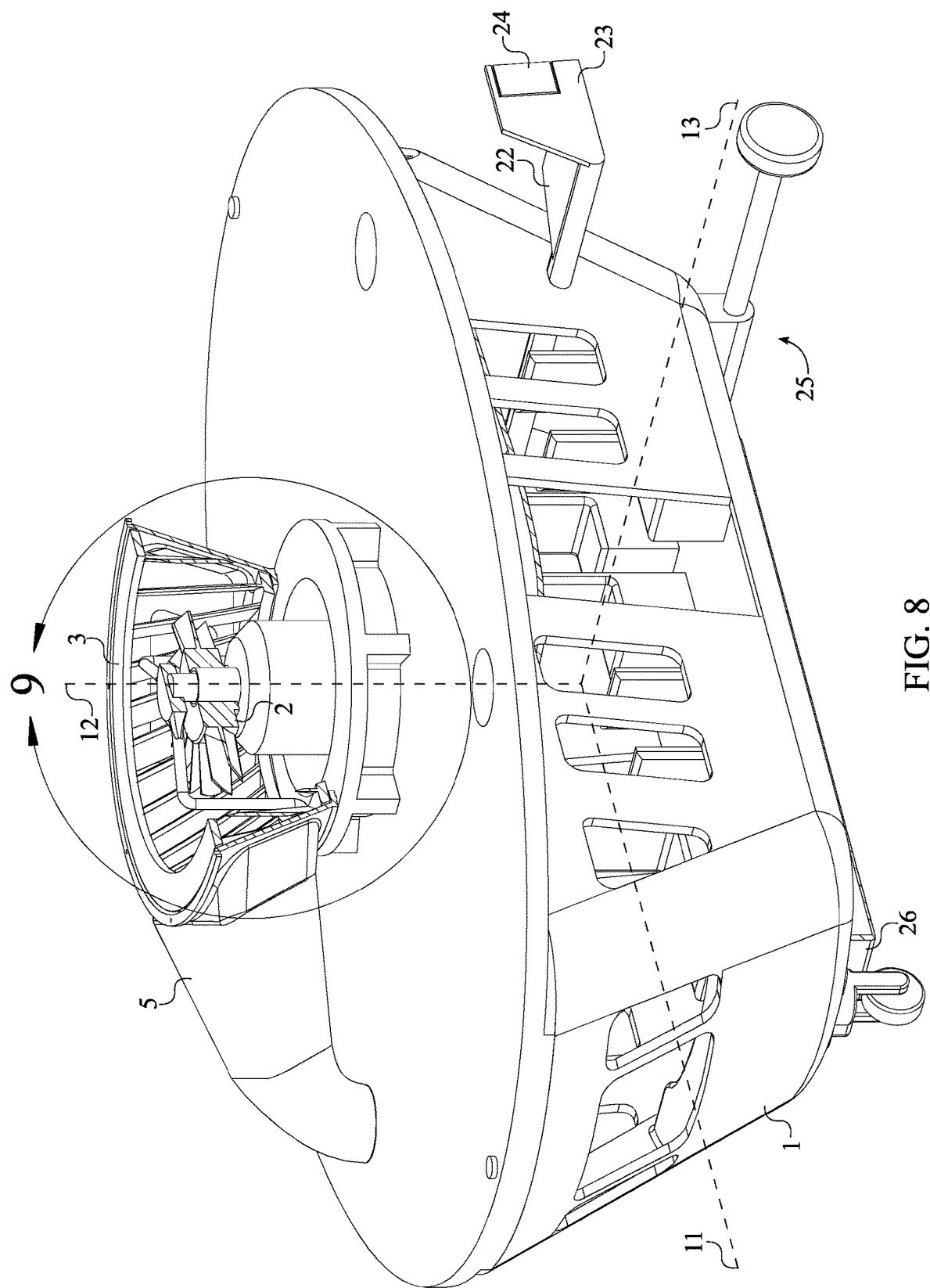
FIG. 8 is a cross-sectional view taken along line 8-8 in FIG. 7 illustrating the cross section of the plurality of lift funnels, the propulsion funnel, the first axial-flow rotor, and the radial-flow rotor.

Referring to FIG. 7 and FIG. 8, a first motor 6 powers both the first axial-flow rotor 2 and the radial-flow rotor 3. The first motor 6 is operatively coupled to the first axial-flow rotor 2, wherein the first motor 6 is used to rotate the first axial-flow rotor 2 in a first rotational direction. Similarly, the first motor 6 is operatively coupled to the radial-flow rotor 3, wherein the first motor 6 is used to rotate the first axial-flow rotor 2 in a second rotational direction. To eliminate reaction moments created by the rotation of the first axial-flow rotor 2 and the radial-flow rotor 3, the first axial-flow rotor 2 and the radial-flow rotor 3 are counter-rotating. As such, the first rotational direction is opposite to the second rotational direction. This eliminates the unwanted rotation of the fuselage 1 and enables the present invention to remain level when hovering.

Figure 9:
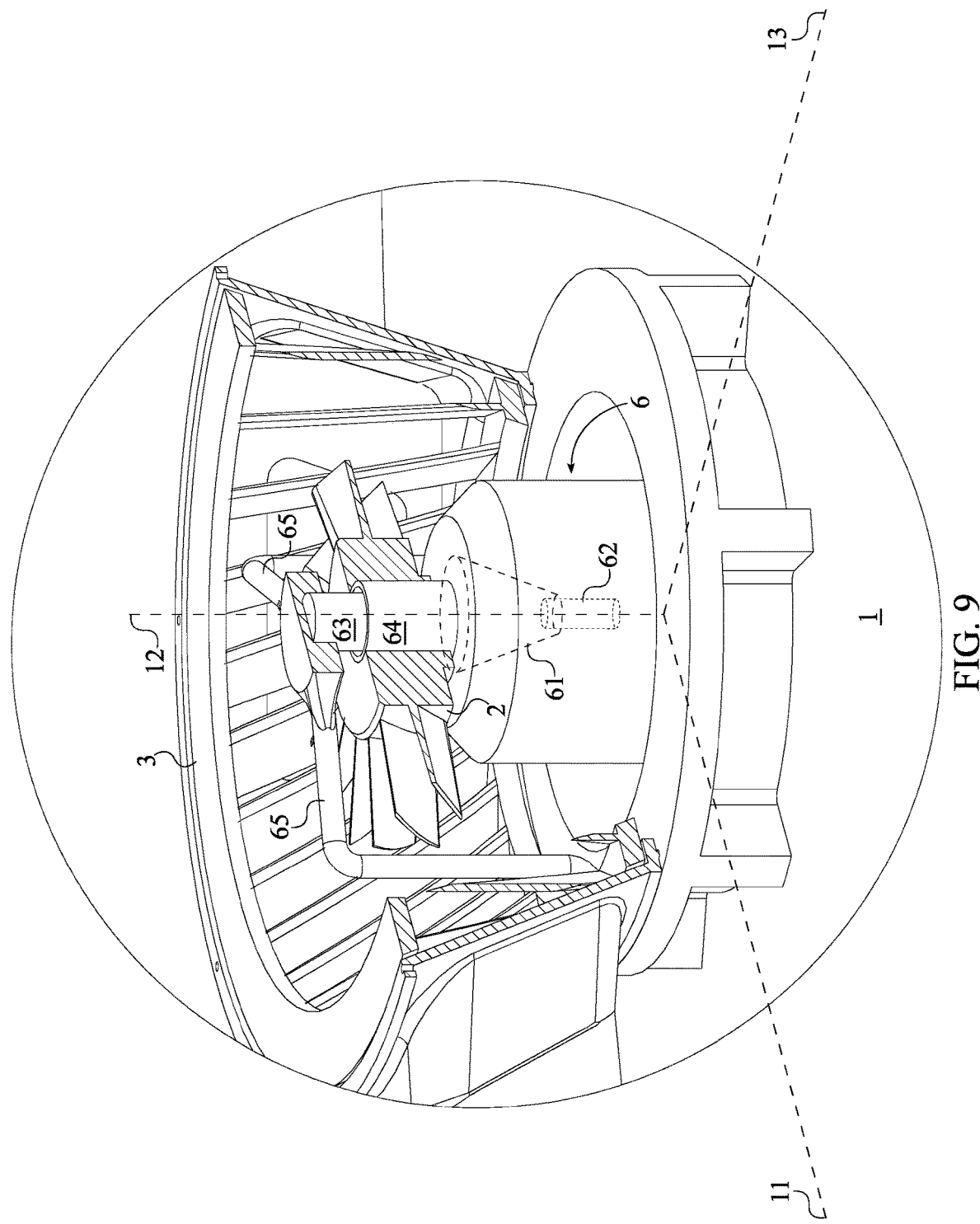
FIG. 9 is a detail view taken about circle 9 in FIG. 8.

As can be seen in FIG. 9, in a manned embodiment of the present invention, the first motor 6 may be gas turbine or an internal combustion engine. Alternately, in an unmanned embodiment, the first motor 6 may be an electric motor. The first motor 6 comprises a rotational output 61, a transmission 62, a drive shaft 63, a drive tube 64, and a plurality of spokes 65. The drive shaft 63 and the drive tube 64 provide a compact driving mechanism for the first axial-flow rotor 2 and the radial-flow rotor 3. Accordingly, the transmission 62 adjusts the power and torque applied to the drive shaft 63 and the drive tube 64 by the rotational output 61. More specifically, the rotational output 61 being operatively coupled to the drive shaft 63 through the transmission 62, wherein the transmission 62 is used to transfer rotation motion at a desired gear ratio from the rotational output 61 to the drive shaft 63. To enable hovering flight, the transmission 62 is configured to transmit all or a part of the rotational output 61 to the drive tube 64, thereby halting the first axial-flow rotor 2 and the resulting forward thrust. As a result, lift can be generated independent of forward thrust to allow the present invention to hover in place. To reduce the overall footprint of the first motor 6, the drive shaft 63 is positioned through the drive tube 64. Further, the drive tube 64 is counter-rotatably mounted around the drive shaft 63. Preferably, the first axial-flow rotor 2 is mounted directly onto the drive tube 64, whereby the first axial-flow rotor 2 is torsionally connected around the drive tube 64. Similarly, the radial-flow rotor 3 connects to the drive shaft 63 via the plurality of spokes 65, whereby the radial-flow rotor 3 is torsionally connected to the drive shaft 63 by the plurality of spokes 65. Each of the plurality of spokes 65 is an L-shaped tube. A first end of the L-shaped tube terminally connects onto the drive shaft 63 and, second end connects to the rim of the radial-flow rotor 3. Thus, the plurality of spokes 65 and the drive tube 64 are positioned offset from each other along the drive shaft 63. This allows the radial-flow rotor 3 to be at the same vertical position as the first axial-flow rotor 2 while being connected to the drive shaft 63.

Figure 6:
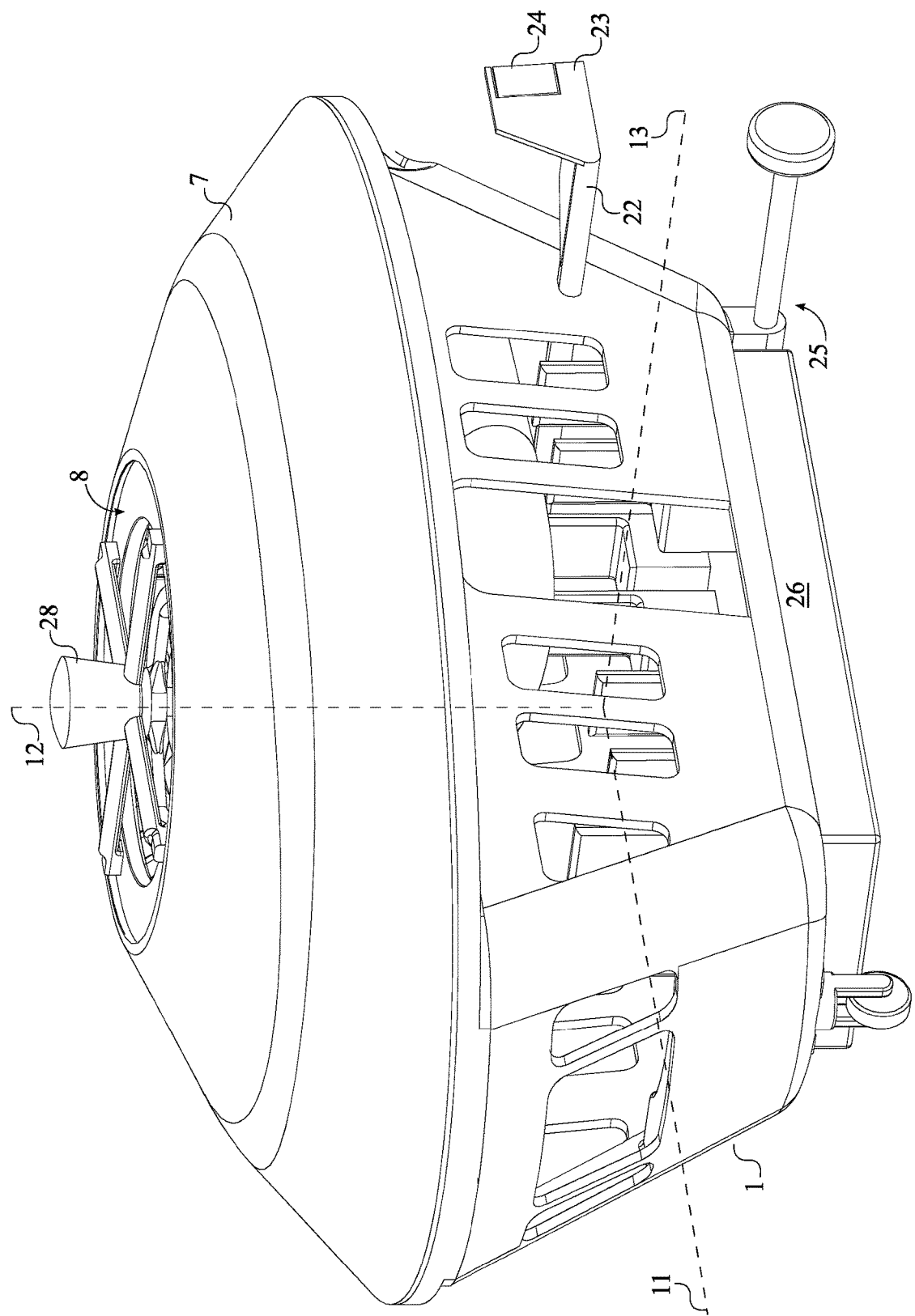
FIG. 6 is a front perspective view illustrating the orientation of the roll, yaw, and pitch axis in relation to the fuselage.

Referring to FIG. 1, FIG. 5, and FIG. 6, to reduce aerodynamic drag and enable longer and more efficient flight, the radial-flow rotor 3 is enclosed by an aerodynamic housing 7. Lift is generated by air being sucked in through an intake port 8 and forced out of the plurality of lift funnels 5. In the preferred embodiment, the aerodynamic housing 7 is mounted adjacent to the fuselage 1. More specifically, the aerodynamic housing 7 is sized to form a coextensive fit with the roof of the fuselage 1. The intake port 8 is integrated into the aerodynamic housing 7. Preferably, the intake port 8 traverses vertically into the aerodynamic housing 7 allowing air to be sucked in by the radial-flow rotor 3 and circulated through the plurality of lift funnels 5. Preferably, the aerodynamic housing 7 is a hollow elliptical dome that fits over the propulsion inlet 41, the radial-flow rotor 3, and the plurality of lift funnels 5. As such, the first axial-flow rotor 2 and the radial-flow rotor 3 are positioned in between the aerodynamic housing 7 and the fuselage 1. The intake port 8 is in fluid communication with the first axial-flow rotor 2 and the radial-flow rotor 3. More specifically, the radial-flow rotor 3 is housed inside a conical housing which forms an airtight seal between the radial-flow rotor 3 and the plurality of lift funnels 5. The radial-flow rotor 3 is concentrically positioned in the conical housing with the plurality of lift funnels 5 connecting adjacent to the sidewall of the conical housing. Further, the intake port 8 of the aerodynamic housing 7 is positioned concentric to the conical housing. The intake port 8 is lined by a sealing ring that seals the gap between the conical housing and the radial-flow rotor 3. This forms an airtight seal between the aerodynamic housing 7 and the plurality of lift funnels 5 which increases the effectiveness of the radial-flow rotor 3. Further, this also separates the airflow within the propulsion funnel 4 used to propel the present invention. In a possible embodiment of the present invention, a parachute box 28 may be mounted on top of the conical housing. The parachute box 28 automatically deploys a parachute in case of a mechanical failure.

Figure 10:
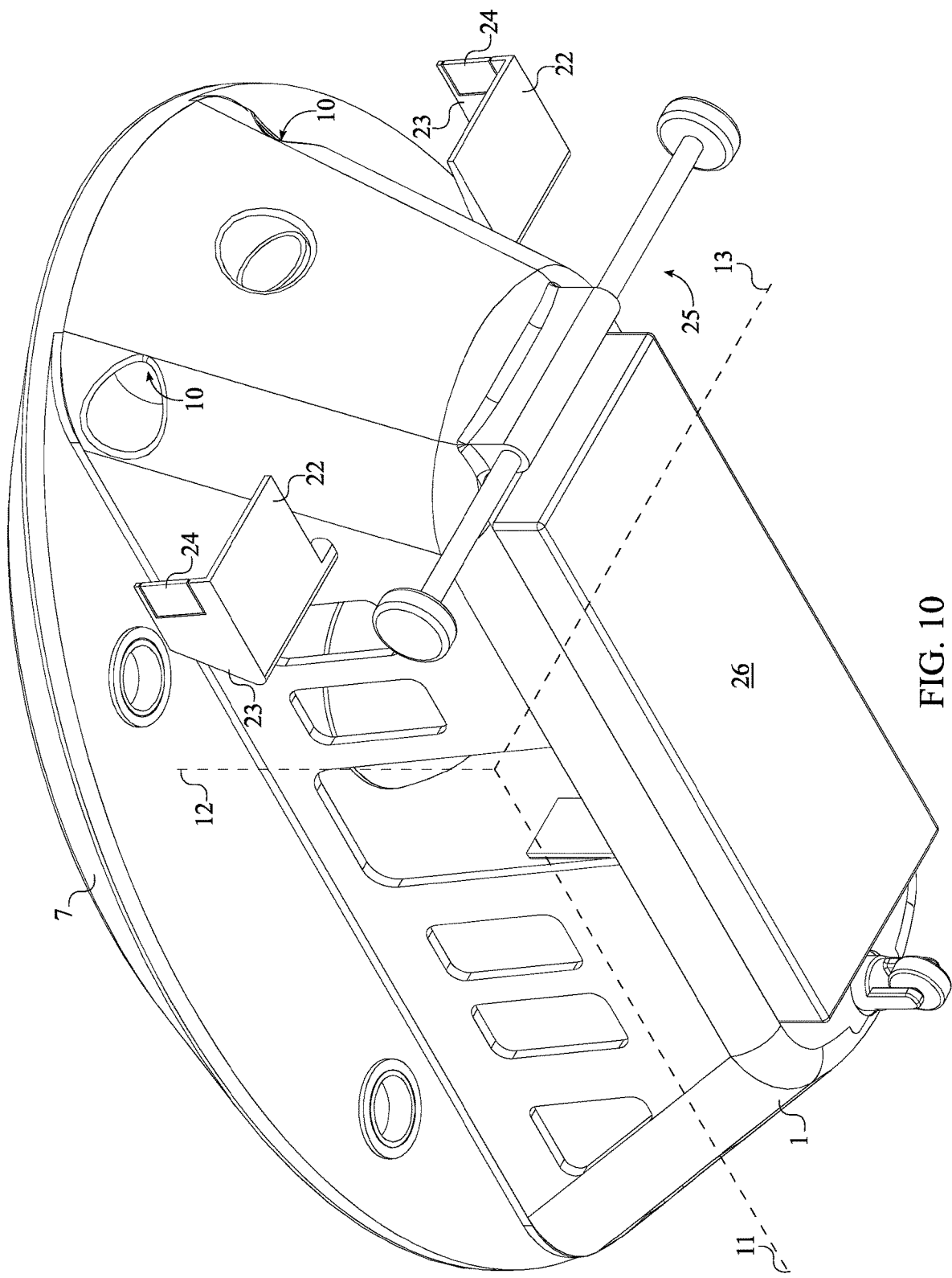
FIG. 10 is a rear perspective view illustrating the orientation of the roll, yaw, and pitch axis in relation to the fuselage.
Figure 11:
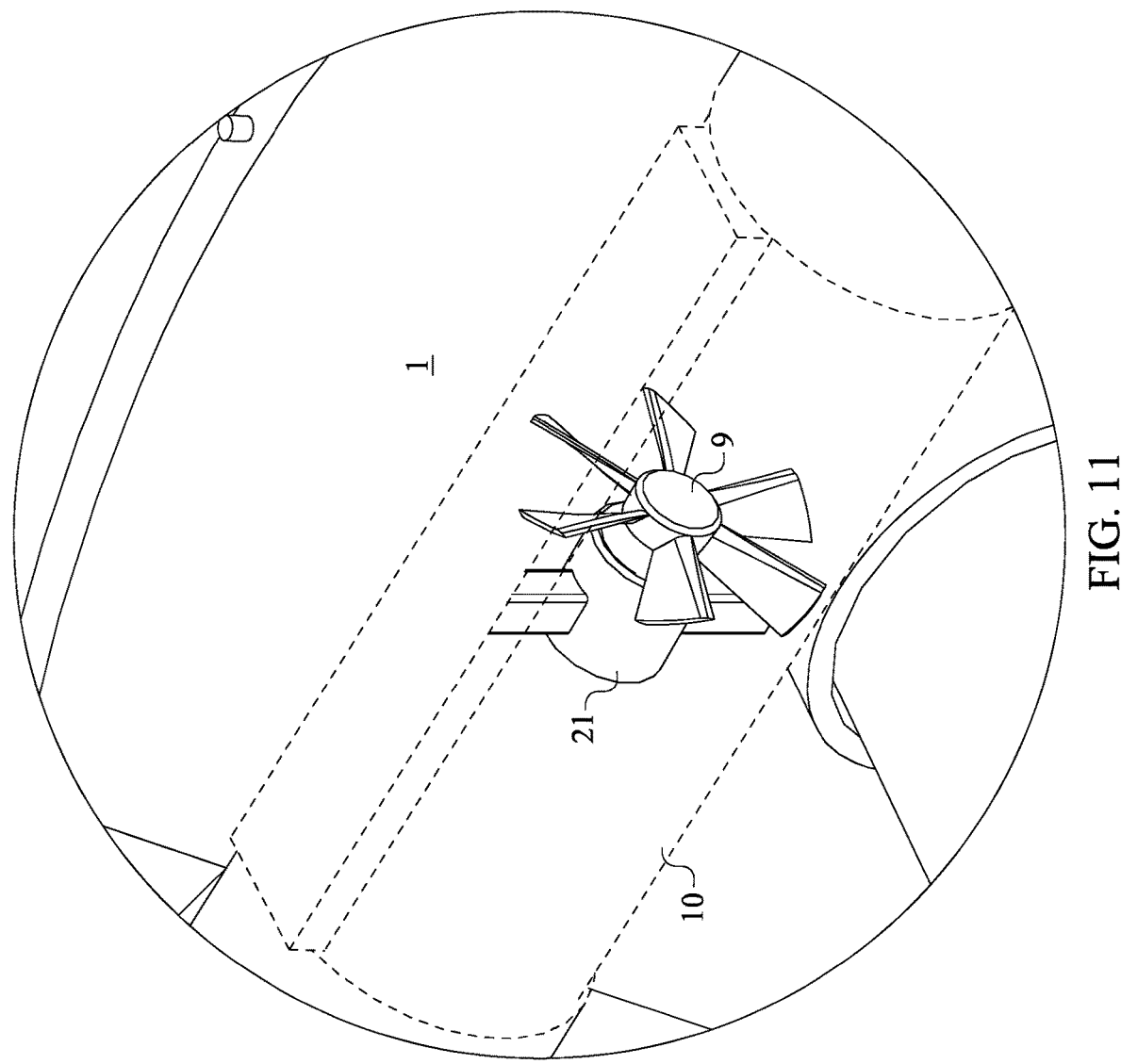
FIG. 11 is a detail view taken about circle 11 in FIG. 1 illustrating a transparent view of tail port and a solid line view of the second axial-flow rotor mounted therein.

Referring to FIG. 1, FIG. 10, and FIG. 11, although the first axial-flow rotor 2 and the radial-flow rotor 3 are designed to preserve straight and level flight, a second axial-flow rotor 9 is necessary to perform fine adjustments on the heading of the present invention. Preferably, the second axial-flow rotor 9 is housed inside a tail port 10. As such, the tail port 10 is integrated through the fuselage 1. Further, the second axial-flow rotor 9 is terminally positioned along the fuselage 1. In particular, the tail port 10 may be positioned adjacent to the propulsion outlet 42. A rotation axis of the second axial-flow rotor 9 is positioned perpendicular and coincident with the pitch axis 13 of the fuselage 1. Thrust is generated by the rotation of the second axial-flow rotor 9 is the clockwise or counter-clockwise direction. As such, the second axial-flow rotor 9 is rotatably mounted within the fuselage 1. Preferably, the direction of the thrust generated by the second axial-flow rotor 9 is perpendicular to direction of flight. To maneuver the present invention, the second axial-flow rotor 9 applied thrust to the left or right of the fuselage as needed. As a result, the second axial-flow rotor 9 can be used to rotate the present invention in both directions about the yaw axis 12.

The second axial-flow rotor 9 is powered by a second motor 21. The preferred second motor 21 may be an electric motor that can rotate in both clockwise and counter-clockwise direction. The second motor 21 is operatively coupled to the second axial-flow rotor 9, wherein the second motor 21 is used to rotate the second axial-flow rotor 9. More specifically, the second axial-flow rotor 9 is connected to a rotational output of the electric motor. In addition to providing correctional inputs to preserve the straight and level flight, the second axial-flow rotor 9 can also cause the present invention to make gradual turns. For example, applying a low thrust in the left direction while the present invention traveling forward, causes the present invention to gradually turn to the right.

In the same vein, a pair of horizontal stabilizers 22 is provided to increase stability while the present invention is making a turn or changing altitude. The pair of horizontal stabilizers 22 is mounted adjacent to the fuselage 1. More specifically, the pair of horizontal stabilizers 22 is positioned to rear of the fuselage 1. Further, the pair of horizontal stabilizers 22 is positioned opposite to each other about the fuselage 1.

Referring back to FIG. 1 and FIG. 10, similarly, a pair of vertical stabilizers 23 increases stability about the yaw axis 12. The pair of vertical stabilizers 23 generates lateral forces to correct the orientation of the fuselage 1 about the yaw axis 12. The pair of vertical stabilizers 23 is mounted adjacent to the fuselage 1. More specifically, each of the pair of vertical stabilizers 23 is terminally connected onto each of the pair of horizontal stabilizers 22. Further, the pair of vertical stabilizers 23 is positioned opposite to each other about the fuselage 1. Preferably, each of the pair of vertical stabilizers 23 is a symmetrical airfoil that only generates lift when the oncoming airflow is at an angle with the chord line. Since the pair of vertical stabilizers 23 is oriented perpendicular to the roll axis 11 of the fuselage 1, the lift forces generated by the pair of vertical stabilizers 23 point to the sides of the fuselage 1. Thus, the pair of vertical stabilizers 23 automatically generate corrective inputs if the fuselage 1 starts to skid along the desired flight path.

To further help maneuver the fuselage 1, a pair of rudders 24 allows the user to control the application of corrective inputs along the yaw axis 12. As such, the pair of rudders 24 is operatively integrated into a corresponding stabilizer from the pair of vertical stabilizers 23, wherein the pair of rudders 24 is used to selectively guide air flow across the pair of vertical stabilizers 23. More specifically, each of the pair of rudders 24 is hingedly mounted onto the corresponding stabilizer from the pair of vertical stabilizers 23, wherein the pair of rudders 24 is used to selectively guide air flow across the pair of vertical stabilizers 23. The pilot or the operator can rotate the pair of rudders 24 together or separately as needed. In addition to giving the operator more control, the pair of rudders 24 also greatly increases the lift generated by the pair of vertical stabilizers 23. More specifically, the pair of rudders 24 deflects the oncoming airflow to push the pair of vertical stabilizers 23 in the opposite direction. Further, the pair of rudders 24 allows the pair of vertical stabilizers 23 to generate lift on-demand. The symmetrical airfoil of the pair of vertical stabilizers 23 does not need to be at an angle to generate lift. As a result, the pair of rudders 24 makes for a more versatile and capable maneuvering system.

A tri-wheeled landing gear 25 is provided to allow the present invention to land horizontally on a landing strip or a runway. The tri-wheeled landing gear 25 is laterally mounted to the fuselage 1, opposite to the first axial-flow rotor 2 and the radial-flow rotor 3. The preferred tri-wheeled landing gear 25 positioned on an external face of the fuselage 1 and is therefore permanently exposed. The tri-wheeled landing gear 25 comprises a pair of rear wheels and a front wheel. The pair of rear wheels connect to the fuselage 1 via an axle. The rotation axes the front wheel and the pair of rear wheels are preferably mounted perpendicular to the roll axis 11 of the fuselage 1. Further, the tri-wheeled landing is also positioned symmetrically along the roll axis 11 to ensure even weight distribution. In alternate embodiments, the tri-wheeled landing gear 25 may be retractable and therefore housed within the fuselage 1. In yet another embodiment, the present invention may be equipped with a landing gear utilizing any number of wheels.

Figure 12:
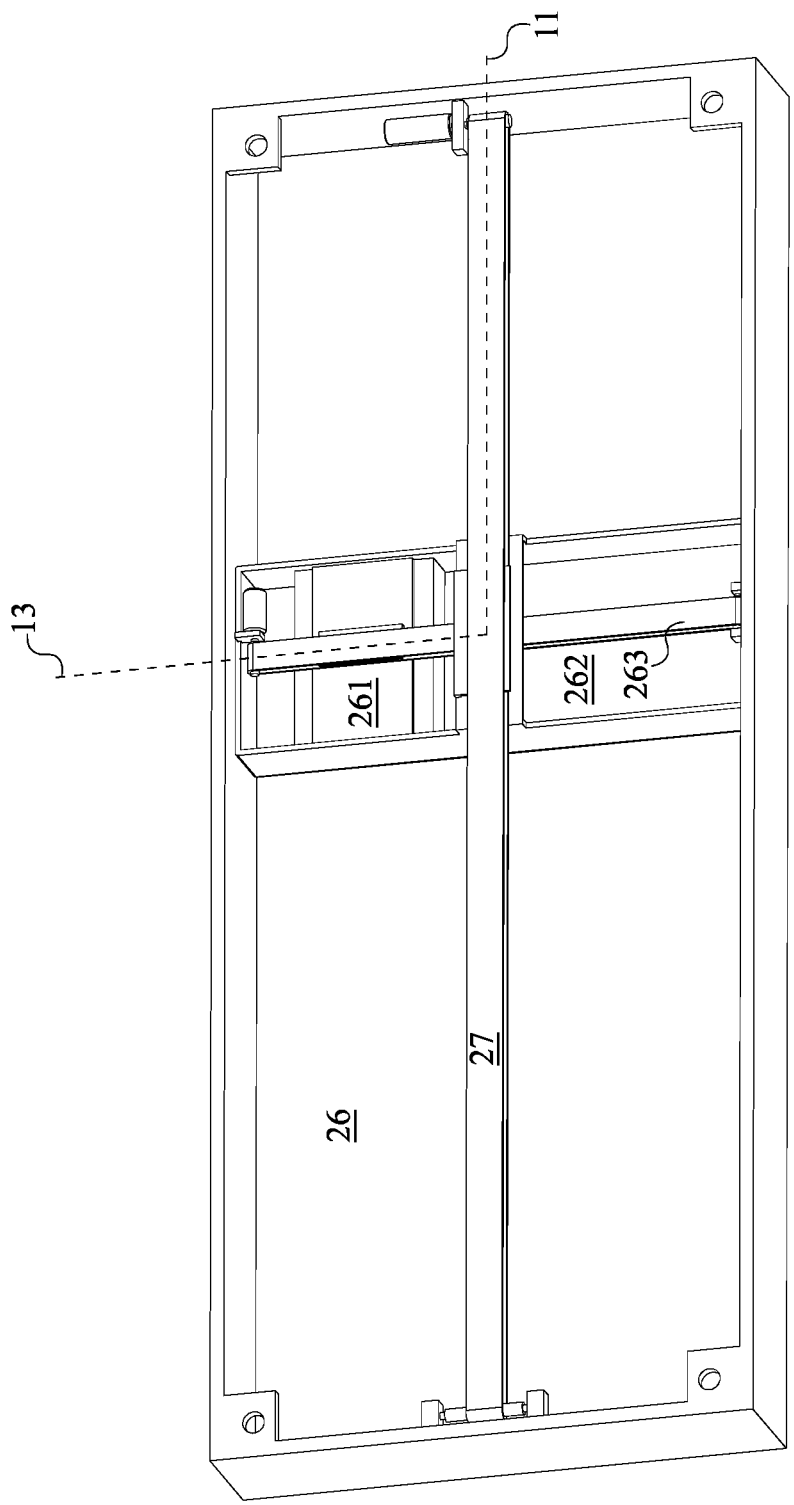
FIG. 12 is a top perspective view of the ballast assembly illustrating the ballast frame operatively connected to the first linear-movement mechanism.

Referring to FIG. 10 and FIG. 12, a ballast assembly 26 changes the weight distribution of the present invention and causes the present invention to yaw and roll. A first linear-movement mechanism 27 repositions the ballast assembly 26, thereby changing the weight distribution. Preferably, the first linear-movement mechanism 27 is mounted adjacent to the fuselage 1. More specifically, the balancing assembly is connected onto the bottom surface of the fuselage 1. The first linear-movement mechanism 27 is aligned parallel to the roll axis 11 of the fuselage 1. Further, the ballast assembly 26 is operatively coupled to the first linear-movement mechanism 27, wherein the first linear-movement mechanism 27 is used to translate the ballast assembly 26 across the fuselage. As a result, the first positioning belt is used to reposition the movable ballast along the length of the balancing box.

Referring more specifically to FIG. 12, repositioning the movable ballast along the first positioning belt redistributes the weight of the present invention about the roll axis 11. To redistribute the weight about the pitch axis 13, the ballast assembly 26 comprises a ballast weight 261, a ballast frame 262, and a second linear-movement mechanism 263. The ballast weight 261 is sized to fit across the width of the ballast frame 262. The second linear-movement mechanism 263 is mounted onto the ballast frame 262. Further, the second linear-movement mechanism 263 is aligned parallel to the pitch axis 13 of the fuselage. In the preferred embodiment, both the first positioning belt and the second positioning belt are conveyers belt driven by electric motors. As such, the first positioning belt and the second positioning belt can reposition the ballast assembly 26 by actuating the electric motors.

The ballast weight 261 is operatively coupled to the second linear-movement mechanism 263, wherein the second linear-movement mechanism 263 is used to translate the ballast assembly 26 across the fuselage. By repositioning the ballast assembly 26 about the roll axis 11, the fuselage 1 can be made to pitch in the forward and aft direction. For example, moving the ballast assembly 26 towards the aft of the balancing box causes the fuselage 1 to tilt backwards and start moving towards the back. Similarly, moving the ballast assembly 26 towards the front, causes the fuselage 1 to tilt forward. Tilting the fuselage 1 forward also causes the fuselage 1 to move in forward direction because the direction of the upward thrust tils along with the fuselage 1. Similarly, the present invention can be made to roll by repositioning the ballast weight 261 within the ballast frame 262. For example, moving the weight to the sides of the ballast frame 262 causes the fuselage 1 to tilt about the roll axis 11. Tilting the fuselage 1 to the sides causes the fuselage 1 to move sideways.

Although the invention has been explained in relation to its preferred embodiment, it is to be understood that many other possible modifications and variations can be made without departing from the spirit and scope of the invention as hereinafter claimed.

What is claimed is:

1. A rotorcraft with counter-rotating rotor blades comprises:
   a fuselage;
   a first axial-flow rotor;
   a radial-flow rotor;
   a propulsion funnel;
   a plurality of lift funnels;
   the propulsion funnel comprises a propulsion inlet and a propulsion outlet;
   each of the plurality of lift funnels comprises a lift inlet and a lift outlet;
   the first axial-flow rotor and the radial-flow rotor being rotatably and laterally mounted to the fuselage;
   the first axial-flow rotor being encircled by the radial-flow rotor;
   a rotation axis of the first axial-flow rotor and a rotation axis of the radial-flow rotor being coaxially positioned to a yaw axis of the fuselage;
   the first axial-flow rotor being in fluid communication with the propulsion inlet;
   the propulsion outlet being positioned adjacent to the fuselage;
   the propulsion outlet being concentrically positioned around a roll axis of the fuselage;
   the radial-flow rotor being in fluid communication with the lift inlet for each of the plurality of lift funnels;
   the lift outlet for each of the plurality of lift funnels being positioned around the fuselage; and
   the lift outlet for each of the plurality of lift funnels being positioned parallel to the yaw axis of the fuselage.

2. The rotorcraft with counter-rotating rotor blades as claimed in claim 1 comprises:
   a first motor;
   the first motor being operatively coupled to the first axial-flow rotor wherein the first motor is used to rotate the first axial-flow rotor in a first rotational direction;
   the first motor being operatively coupled to the radial-flow rotor, wherein the first motor is used to rotate the first axial-flow rotor in a second rotational direction; and
   the first rotational direction being opposite to the second rotational direction.

3. The rotorcraft with counter-rotating rotor blades as claimed in claim 2 comprises:
   the first motor comprises a rotational output, a transmission, a drive shaft, a drive tube, and a plurality of spokes;
   the rotational output being operatively coupled to the drive shaft through the transmission, wherein the transmission is used to transfer rotation motion at a desired gear ratio from the rotational output to the drive shaft;
   the drive shaft being positioned through the drive tube;
   the drive tube being counter-rotatably mounted around the drive shaft;
   the plurality of spokes and the drive tube being positioned offset from each other along the drive shaft;
   the first axial-flow rotor being torsionally connected around the drive tube; and
   the radial-flow rotor being torsionally connected to the drive shaft by the plurality of spokes.

4. The rotorcraft with counter-rotating rotor blades as claimed in claim 1 comprises:
   an aerodynamic housing;
   an intake port;
   the aerodynamic housing being mounted adjacent to the fuselage;
   the intake port being integrated into the aerodynamic housing;
   the first axial-flow rotor and the radial-flow rotor being positioned in between the aerodynamic housing and the fuselage; and
   the intake port being in fluid communication with the first axial-flow rotor and the radial-flow rotor.

5. The rotorcraft with counter-rotating rotor blades as claimed in claim 1 comprises:
   the propulsion funnel being positioned through the fuselage; and
   the propulsion funnel tapering from the propulsion inlet to the propulsion outlet.

6. The rotorcraft with counter-rotating rotor blades as claimed in claim 1 comprises:
   each of the plurality of lift funnels being mounted about the fuselage;
   the plurality of lift funnels being radially mounted around the yaw axis of the fuselage; and
   each of the plurality of lift funnels tapering from the lift inlet to the lift outlet.

7. The rotorcraft with counter-rotating rotor blades as claimed in claim 1 comprises:
   a second axial-flow rotor;
   a tail port;
   the tail port being integrated through the fuselage;
   the tail port being terminally positioned along the fuselage;
   the second axial-flow rotor being rotatably mounted within the fuselage; and
   a rotation axis of the second axial-flow rotor being positioned perpendicular and coincident with the pitch axis of the fuselage.

8. The rotorcraft with counter-rotating rotor blades as claimed in claim 7 comprises:
a second motor; and
the second motor being operatively coupled to the second axial-flow rotor, wherein the second motor is used to rotate the second axial-flow rotor.

9. The rotorcraft with counter-rotating rotor blades as claimed in claim 1 comprises:
a pair of horizontal stabilizers;
the pair of horizontal stabilizers being mounted adjacent to the fuselage; and
the pair of horizontal stabilizers being positioned opposite to each other about the fuselage.

10. The rotorcraft with counter-rotating rotor blades as claimed in claim 1 comprises:
a pair of vertical stabilizers;
the pair of vertical stabilizers being mounted adjacent to the fuselage; and
the pair of vertical stabilizers being positioned opposite to each other about the fuselage.

11. The rotorcraft with counter-rotating rotor blades as claimed in claim 10 comprises:
a pair of rudders; and
the pair of rudders being operatively integrated into a corresponding stabilizer from the pair of vertical stabilizers, wherein the pair of rudders is used to selectively guide air flow across the pair of vertical stabilizers.

12. The rotorcraft with counter-rotating rotor blades as claimed in claim 1 comprises:
a tri-wheeled landing gear; and
the tri-wheeled landing gear being laterally mounted to the fuselage, opposite to the first axial-flow rotor and the radial-flow rotor.

13. The rotorcraft with counter-rotating rotor blades as claimed in claim 1 comprises:
a ballast assembly;
a first linear-movement mechanism;
the first linear-movement mechanism being mounted adjacent to the fuselage;
the first linear-movement mechanism being aligned parallel the roll axis of the fuselage; and
the ballast assembly being operatively coupled to the first linear-movement mechanism, wherein the first linear-movement mechanism is used to translate the ballast assembly across the fuselage.

14. The rotorcraft with counter-rotating rotor blades as claimed in claim 13 comprises:
the ballast assembly comprises a ballast weight, a ballast frame, and a second linear-movement mechanism;
the second linear-movement mechanism being mounted onto the ballast frame;
the second linear-movement mechanism being aligned parallel to the pitch axis of the fuselage; and
the ballast weight being operatively coupled to the second linear-movement mechanism, wherein the second linear-movement mechanism is used to translate the ballast assembly across the fuselage.

15. A rotorcraft with counter-rotating rotor blades comprises:
a fuselage;
a first axial-flow rotor;
a radial-flow rotor;
a propulsion funnel;
a plurality of lift funnels;
an aerodynamic housing;
an intake port;
the propulsion funnel comprises a propulsion inlet and a propulsion outlet;
each of the plurality of lift funnels comprises a lift inlet and a lift outlet;
the first axial-flow rotor and the radial-flow rotor being rotatably and laterally mounted to the fuselage;
the first axial-flow rotor being encircled by the radial-flow rotor;
a rotation axis of the first axial-flow rotor and a rotation axis of the radial-flow rotor being coaxially positioned to a yaw axis of the fuselage;
the first axial-flow rotor being in fluid communication with the propulsion inlet;
the propulsion outlet being positioned adjacent to the fuselage;
the propulsion outlet being concentrically positioned around a roll axis of the fuselage;
the radial-flow rotor being in fluid communication with the lift inlet for each of the plurality of lift funnels;
the lift outlet for each of the plurality of lift funnels being positioned around the fuselage;
the lift outlet for each of the plurality of lift funnels being positioned parallel to the yaw axis of the fuselage;
the aerodynamic housing being mounted adjacent to the fuselage;
the intake port being integrated into the aerodynamic housing;
the first axial-flow rotor and the radial-flow rotor being positioned in between the aerodynamic housing and the fuselage; and
the intake port being in fluid communication with the first axial-flow rotor and the radial-flow rotor.

16. The rotorcraft with counter-rotating rotor blades as claimed in claim 15 comprises:
a first motor;
the first motor comprises a rotational output, a transmission, a drive shaft, a drive tube, and a plurality of spokes;
the first motor being operatively coupled to the first axial-flow rotor wherein the first motor is used to rotate the first axial-flow rotor in a first rotational direction;
the first motor being operatively coupled to the radial-flow rotor, wherein the first motor is used to rotate the first axial-flow rotor in a second rotational direction;
the first rotational direction being opposite to the second rotational direction;
the rotational output being operatively coupled to the drive shaft through the transmission, wherein the transmission is used to transfer rotation motion at a desired gear ratio from the rotational output to the drive shaft;
the drive shaft being positioned through the drive tube;
the drive tube being counter-rotatably mounted around the drive shaft;
the plurality of spokes and the drive tube being positioned offset from each other along the drive shaft;
the first axial-flow rotor being torsionally connected around the drive tube; and
the radial-flow rotor being torsionally connected to the drive shaft by the plurality of spokes.

17. The rotorcraft with counter-rotating rotor blades as claimed in claim 15 comprises:
the propulsion funnel being positioned through the fuselage;
the propulsion funnel tapering from the propulsion inlet to the propulsion outlet;
each of the plurality of lift funnels being mounted about the fuselage;

the plurality of lift funnels being radially mounted around the yaw axis of the fuselage; and each of the plurality of lift funnels tapering from the lift inlet to the lift outlet.

18. The rotorcraft with counter-rotating rotor blades as claimed in claim 15 comprises:
a second axial-flow rotor;
a tail port;
a second motor;
the tail port being integrated through the fuselage;
the tail port being terminally positioned along the fuselage;
the second axial-flow rotor being rotatably mounted within the fuselage;
a rotation axis of the second axial-flow rotor being positioned perpendicular and coincident with the pitch axis of the fuselage; and
the second motor being operatively coupled to the second axial-flow rotor, wherein the second motor is used to rotate the second axial-flow rotor.

19. The rotorcraft with counter-rotating rotor blades as claimed in claim 15 comprises:
a pair of horizontal stabilizers;
a pair of vertical stabilizers;
a pair of rudders;
the pair of horizontal stabilizers being mounted adjacent to the fuselage;
the pair of horizontal stabilizers being positioned opposite to each other about the fuselage;
the pair of vertical stabilizers being mounted adjacent to the fuselage;
the pair of vertical stabilizers being positioned opposite to each other about the fuselage; and
the pair of rudders being operatively integrated into a corresponding stabilizer from the pair of vertical stabilizers, wherein the pair of rudders is used to selectively guide air flow across the pair of vertical stabilizers.

20. The rotorcraft with counter-rotating rotor blades as claimed in claim 15 comprises:
a tri-wheeled landing gear;
a ballast assembly;
the ballast assembly comprises a ballast weight, a ballast frame, and a second linear-movement mechanism;
the tri-wheeled landing gear being laterally mounted to the fuselage, opposite to the first axial-flow rotor and the radial-flow rotor;
a first linear-movement mechanism;
the first linear-movement mechanism being mounted adjacent to the fuselage;
the first linear-movement mechanism being aligned parallel the roll axis of the fuselage;
the ballast assembly being operatively coupled to the first linear-movement mechanism, wherein the first linear-movement mechanism is used to translate the ballast assembly across the fuselage
the second linear-movement mechanism being mounted onto the ballast frame;
the second linear-movement mechanism being aligned parallel to the pitch axis of the fuselage; and
the ballast weight being operatively coupled to the second linear-movement mechanism, wherein the second linear-movement mechanism is used to translate the ballast assembly across the fuselage.

* * * * *